United States Patent

St. Lorant et al.

[15] 3,667,246

[45] June 6, 1972

[54] METHOD AND APPARATUS FOR PRECISE TEMPERATURE CONTROL

[72] Inventors: Steven J. St. Lorant, San Mateo, Calif.; Phillip L. Dow, Geneva, Switzerland

[73] Assignee: The United States of America as represented by the United States Atomic Energy Commission

[22] Filed: Dec. 4, 1970

[21] Appl. No.: 95,237

[52] U.S. Cl. ................................62/208, 62/467, 62/514, 62/56, 62/209, 62/216, 165/2
[51] Int. Cl. ..........................................F25b 41/00
[58] Field of Search ...............62/514, 514 A, 467, 45, 56, 62/216, 208, 209; 165/2

[56] References Cited

UNITED STATES PATENTS

| | | | |
|---|---|---|---|
| 2,996,893 | 8/1961 | Goodenough | 62/514 |
| 3,195,322 | 7/1965 | London | 62/467 |
| 3,195,620 | 7/1965 | Steinhardt | 165/2 |
| 3,272,258 | 9/1966 | Bourquard | 62/514 |
| 3,427,815 | 2/1969 | Pitlor | 62/514 |

Primary Examiner—William J. Wye
Attorney—Roland A. Anderson

[57] ABSTRACT

A temperature control system for maintaining a cryogenic load at a predetermined temperature by circulating a wet mixture of a coolant through tubing that is in heat-transfer relationship with the load while maintaining the coolant in a saturated condition throughout the tubing at a constant temperature that is slightly cooler than the predetermined load temperature. The system includes a preconditioning chamber from which liquid coolant is supplied to the tubing. The chamber is partially filled with liquid coolant, with the remainder of the chamber filled with vaporous coolant. Inlet and outlet metering valves for the tubing are mounted in the chamber and controls are provided for maintaining the entire interior environment of the chamber including the valves, interconnecting tubing and both the liquid and vaporous coolant in a state of thermodynamic equilibrium at a temperature that is a few tenths of a degree lower than the predetermined temperature of the load. Sensors are provided at the load and in the tubing for actuating controllers that manipulate the valves to regulate the coolant flow to be at a rate that maintains the coolant in its saturated wet-mixture condition in all sections of the tubing during heat transfer from the load to the coolant.

7 Claims, 1 Drawing Figure

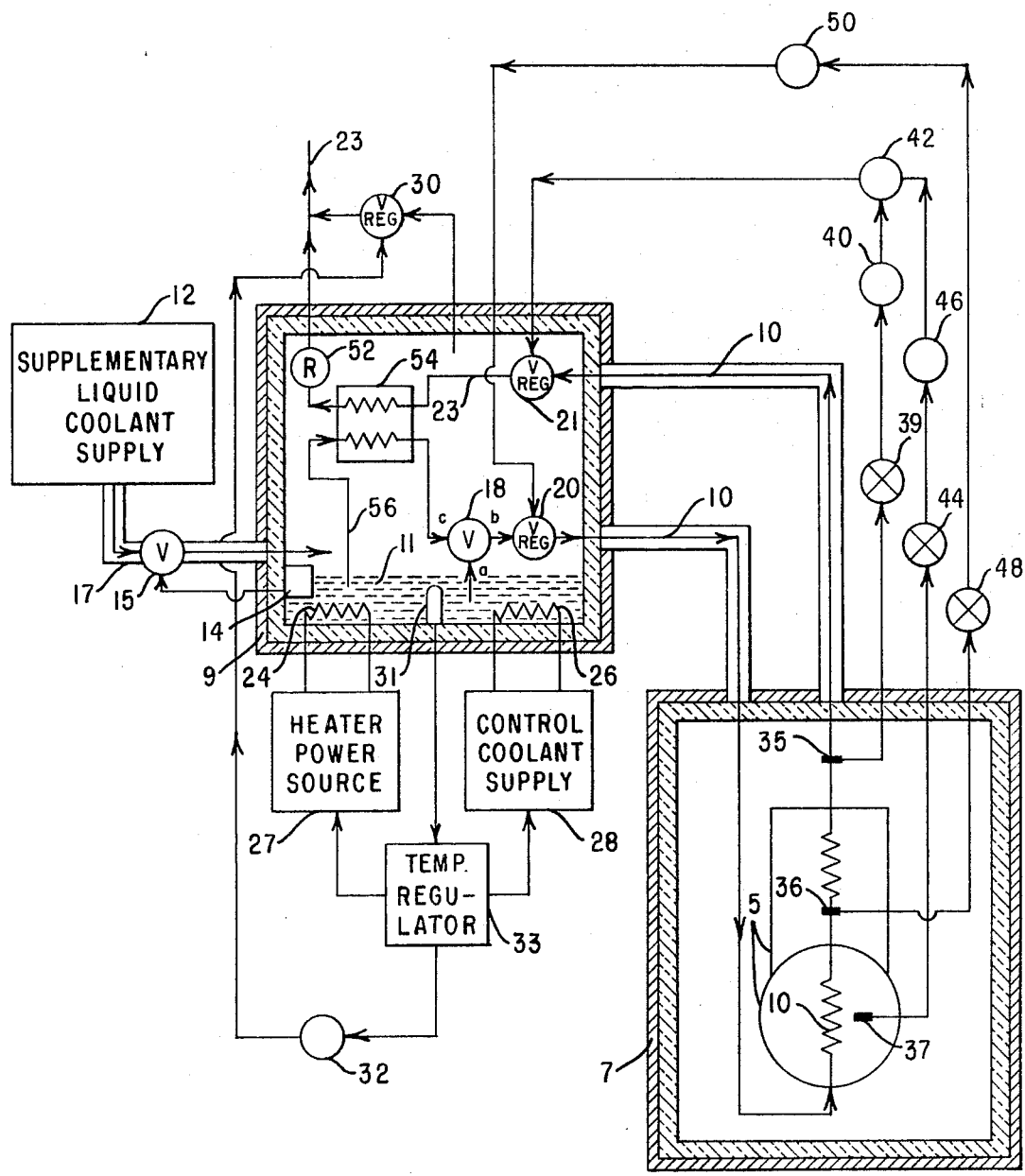

METHOD AND APPARATUS FOR PRECISE TEMPERATURE CONTROL

BACKGROUND OF THE INVENTION

The present invention relates to a system for maintaining a load at a set precise temperature by means of a coolant that is in a saturated wet-mixture condition at all points of heat-transfer relationship with the load, and more particularly, it relates to a temperature control system in which the coolant in both its liquid and vaporous states as well as inlet and outlet metering valves and interconnecting tubing to the load are all maintained in a state of thermodynamic equilibrium.

For successful operation of certain types of heat loads, it is necessary to maintain the load homogeneously constant within very close tolerances even in the presence of sudden load variations. For example, in a liquid hydrogen bubble chamber that is used in conjunction with a high-energy particle accelerator, the paths of subatomic particles are made visible in the form of a series of small bubbles in the hydrogen. Pictures for later study are rapidly taken of the paths before the bubbles disperse. However, an inhomogeneous change in the range of 1/10° F of the liquid hydrogen can cause variations in the density of the mass of hydrogen. The density variations cause convection of the hydrogen; and since masses of differing density refract light at different angles, the paths of the particles in the moving hydrogen masses appear to be unevenly displaced and distorted and any reproductions made of the paths will be inaccurate. It is desirable therefore to precisely maintain the temperature of a bubble chamber uniform and constant. For example, it is found that to obtain satisfactory pictures, the chamber should be maintained within 1/100° F. Preferably, this is accomplished with a minimum of cryogen and without resort to complex and expensive arrangements for compensation of the relatively large temperature differentials that normally develop in the pumps, valves, heat exchangers and interconnecting lines, which differentials, if not compensated, result in thermal leaks to the load.

SUMMARY OF THE INVENTION

In brief, the present invention pertains to a temperature control system for precisely maintaining a heat load at a predetermined temperature and in general, the system includes a heat-emitting mass arranged as the heat load within the system, a supply of liquid coolant, preconditioning means for bringing the supply of liquid coolant to a state of thermodynamic equilibrium at a temperature that is slightly lower than the predetermined load temperature, conduit for conducting liquid coolant from the supply into heat-transfer relationship with the heat-emitting load to absorb heat therefrom, means for circulating the coolant through the conduit from the supply to an area of pressure that is lower than the pressure of the supply, means for sensing changes in the temperature-pressure conditions of the coolant in the conduit, and controlling means that are responsive to the sensing means during heat transfer between the load and the coolant in the conduit for adjusting the rate of coolant flow through the conduit to establish in the conduit a wet mixture of the coolant in a condition of saturation at a temperature slightly below the predetermined load temperature. The preconditioning means may include a preconditioning chamber partially filled with liquid coolant, with the remainder of the chamber filled with vaporous coolant. The liquid and vapor in the chamber is maintained in thermodynamic equilibrium by automatic adjustment of the temperature and pressure within the chamber. Liquid coolant in the chamber is circulated through the conduit to the load through inlet and outlet metering valves at respective ends of the conduit. The temperature and pressure of the coolant within the conduit is adjusted so that all of the liquid coolant is boiling at all times. It is characteristic of the boiling process that the temperature of both the liquid and vaporous coolant is the same and remains constant when under a constant pressure as long as there is any liquid coolant present. Thus upon the sensing means detecting any change in the temperature-pressure conditions in the conduit, the rate of coolant flow is regulated accordingly by the controlling means, which includes the inlet and outlet metering valves, to ensure that a saturated wet mixture of coolant exists throughout all sections of the conduit that is in heat-transfer relationship with the load. By keeping a saturated wet mixture in all parts of the conduit at all times, the temperature of the coolant can be precisely controlled by maintaining the pressure constant since the temperature of the boiling coolant will be uniformly at a constant pressure. For even cooling of the load, it is preferable that the temperature of the coolant within the preconditioning chamber be only slightly below that desired at the load so that the coolant will boil for the entire period that it is in heat-transfer relationship with the load. To minimize heat leaks to the load, the inlet and outlet metering valves and other equipment are mounted within the preconditioning chamber and thereby maintained in thermodynamic equilibrium with the coolant in the chamber. Thus any heat developed in the valves or other apparatus is immediately transferred to the environment of the preconditioning chamber which is automatically controlled to maintain its temperature slightly below that of the load, thereby substantially eliminating heat leaks from such equipment to the load and providing immediate control over temperature differentials, particularly those that tend to develop in the valves.

It is an object of the invention to economically, accurately and uniformly maintain a heat load at a predetermined temperature and to rapidly regulate the temperature to be constant under changing load conditions, according to the invention.

Another object is to regulate the temperature of a heat load by maintaining a coolant in a saturated wet-mixture condition at all points of heat transfer between the load and the coolant.

Another object is to eliminate heat leaks and temperature differentials in a temperature control system.

Another object is to maintain a temperature control system including a heat load, coolant for the load, valves, and other apparatus in a state of thermodynamic equilibrium.

Other objects and advantageous features of the invention will be apparent in a description of a specific embodiment thereof, given by way of example only, to enable one skilled in the art to readily practice the invention, and described hereinafter with reference to the accompanying drawing.

BRIEF DESCRIPTION OF THE DRAWING

The FIGURE is a schematic diagram of a control system for maintaining a heat load precisely at a predetermined temperature.

DESCRIPTION OF AN EMBODIMENT

Referring to the drawing there is shown in the FIGURE a schematic diagram for a temperature control system for a heat load 5 mounted within an insulated vacuum enclosure 7. A coolant supply 11 is maintained in a thermally insulated preconditioning chamber 9 and is supplied under pressure to the load through conduit such as tubing 10. Liquid coolant is supplied to the chamber 9 from a supplementary liquid coolant supply 12. The level of the liquid coolant in the chamber 9 is regulated to be at a predetermined level by means of a liquid level control 14 which is mounted in the chamber for controlling a metering valve 15 in a supply line 17 between the supply 12 and the chamber 9. In normal operation, liquid coolant is supplied from the chamber 9 to the tubing 10 through a two-way valve 18 via a port *a* to a port *b* and hence through an inlet metering valve 20, both mounted in the chamber 9. An outlet metering valve 21 for regulating the flow of coolant from the load and hence the pressure and temperature in line 10 also is mounted in the chamber and is connected between the outlet of the tubing 10 and venting tubing 23 which connects to an area of pressure that is lower than the pressure in the chamber 9. Thus, no pumps having moving parts which would introduce localized heating are required. The ullage space in the chamber 9 is filled with vaporous coolant; and all of the contents of the chamber, including the valves 18, 20 and 21 and interconnecting tubing 23 and other apparatus more fully discussed hereinafter, and both the liquid coolant 11 and the vaporous coolant in the ullage space are all maintained in a state of thermodynamic equilibrium at a temperature that is slightly lower than the temperature at which it is desired to maintain the load. This state may be achieved and maintained by means of a regulating system comprised of a heating element 24 and a cooling element 26, powered respectively by a heater power source 27 and a control coolant supply 28, a control valve 30 connected between the ullage space and an area of lower pressure, a temperature sensing element 31, a controller 32, and a temperature regulator 33. The regulator 33 may be made responsive to signals from the element 31 to either raise the temperature of the coolant 11 by activation of the source 27 and element 24 or to lower the temperature of the coolant by activation of the supply 28 and element 26. Further temperature control is provided by manipulation of the valve 30 under control of the regulator 33 to adjust the pressure in the ullage space. When liquid hydrogen is used as the coolant 11, it is preferable that the cooling element 26 and control coolant supply 28 be omitted and that the temperature of the coolant 11 be lowered only by opening the valve 30 under control of the sensor 31, controller 32, and regulator 33. When a coolant such as liquid freon or ammonia is used as the coolant 11, then it is preferable that the element 26 and supply 28 be included in the system.

In order to stabilize the temperature of the chamber under changing coolant flow-rate conditions and to make the pressure adjustments of the valve 30 rapid and effective, it is preferable that the chamber 9 be arranged so that the liquid coolant therein has a large free-liquid surface area that is equal to at least one-fourth of the total area bounding the liquid coolant, and that the liquid level in the chamber be adjusted to provide an ullage space that is filled with vaporous coolant and is relatively larger than the volume of the liquid coolant 11. The relatively large mass of vaporous coolant constitutes a stable pressure ballast to damp pressure fluctuations and hence temperature fluctuations, while the mass of liquid coolant has a high thermal capacity and constitutes a thermal ballast for damping temperature and hence pressure fluctuations. The large free-liquid surface area provides a large evaporation area for rapid and effective heat transfer and acts as a pressure balance between the mass of vaporous coolant and mass of liquid coolant within the chamber 9.

The coolant flow through the tubing 10 is regulated to be at a rate that sustains the coolant in its saturated wet-mixture state in all sections of the tubing 10 during heat transfer from the load 5 to the coolant. This regulation may be accomplished by means of temperature sensors 35 and 36 that are located in the tubing 10 and a temperature sensor 37 at the load. Any change in temperature of the coolant in the tubing 10 is immediately detected by the sensor 35 and a corresponding signal is transmitted through a transducer 39 to a controller 40. The controller 40 is set at the desired load temperature for actuating another controller 42 to increase the opening of the valve 21 upon detection of a rise in temperature from the set temperature and for reducing the opening of the valve 21 upon detection of a drop in temperature. However, as long as liquid coolant remains in all section of the tubing, the liquid will boil at the saturation temperature during heat transfer from the load to the coolant, and since there will be no rise from the saturation temperature, the setting of the valve 21 will not change. Upon complete boiling away of liquid coolant at any point in the tubing 10 the temperature and pressure throughout the tubing tends to rise, thereby causing the opening of the valve 21 to increase and permit a greater flow of liquid coolant. The tubing 10 is thereby maintained partially filled with liquid coolant along its entire length.

In order to prevent the system from "hunting" about the set predetermined load temperature, signals from the sensor 37 a the load are transmitted through a transducer 44 to a rate controller 46 which gives an output signal proportional to the rate of temperature change at the load. This rate signal is applied to the controller 42 which is responsive thereto to modulate the signal from the sensor 35 in direct proportion to the rate of load temperature change. Thus, the rate of change of the load temperature is determined and superimposed on the signal that controls the opening of the valve 21. If the load temperature changes slowly, the rate of change of the signal to valve 21 is low to slowly change its opening or closing. If the load temperature changes rapidly, the rate of change of the signal to valve 21 is high to rapidly change the opening or closing of the valve. Since in general the temperature at a load tends to lag the temperature in the tubing 10, this particular manner of combining the signals in the controller 42 prevents the system from oscillating or hunting about the set temperature.

In order to provide more precise control over the rate of coolant flow through the tubing 10 and therefore more precise control over the temperature in the tubing, the sensor 36 is located to transmit signals that correspond to the temperature in the tubing through a transducer 48 to a controller 50 which controls the opening of the metering valve 20. The controller 50 is set at the predetermined load temperature for increasing the opening of the valve 20 upon a rise in temperature being detected in the tubing 10 by the sensor 36 and for reducing the valve opening upon detection of a temperature reduction.

For best operation of the system, the coolant 11 is held in the chamber 9 in a continuously boiling state at a temperature that is slightly less than the load temperature; in practice a few tenths of a degree temperature difference has been found to be satisfactory for liquid hydrogen as the coolant. Thus, as coolant is passed into heat-transfer relationship with the load, it continues to boil to dissipate the load heat and thereby maintain the set load temperature, and since the pressure in the tubing 10 is held constant by means of the valves 20 and 21, the temperature of the coolant remains constant at the saturation temperature.

Preferably, the valves 20 and 21 are adjusted so that there is a slight flow of liquid coolant beyond the valve 21 into the tubing 23. This ensures that there is always a wet mixture in the tubing 10 to provide the temperature-pressure regulation unique to the system. By keeping the liquid coolant flow in the tubing 23 slight, nearly all of the liquid coolant is boiled at the load and only a small amount is vented to the tubing 23 which in turn is shown vented to the atmosphere. The slight flow results in maximum economic utilization of the liquid coolant which may be a substantial cost when liquid hydrogen is used as a coolant. To achieve the desirable amount of liquid coolant flow through the valve 21, a rate meter 52 may be inserted in the line 23 and the valves 20 and 21 manually adjusted to an acceptable liquid flow rate before being placed under control of the controllers 42 and 50.

An alternative to venting the coolant to atmosphere, particularly in the case of a coolant having a relatively high cost such as hydrogen, is to reliquefy the coolant and return it to the supply 12. Such means are not shown but are well-known in the art.

Where a liquid coolant such as a liquid gas is to be used and it has a temperature that is substantially different with respect to the initial temperature of the load, a heat exchanger 54 may be inserted in the line 23 and a line 56 to the valve 18, whereby the valve 18 may be turned to direct flow of coolant 11 from a third port $c$ to the port $a$ so that the coolant 11 flows through the heat exchanger 54 to the tubing 10. The coolant to the load is preheated by the coolant in the line 23 from the load, thus reducing the differential between the incoming coolant temperature and the initial load temperature to thereby minimize the occurrence of high stresses in the apparatus. By mounting the exchanger 54 in the chamber 9, heat leaks from the exchanger to the line 10 and the load during normal operation of the system are eliminated.

In an embodiment exemplifying the invention, a preconditioning chamber having a total volume of 550 gallons was filled with 150 gallons of liquid from a liquid hydrogen supply having an average temperature of about 25° K. The temperature and pressure of the chamber was regulated to be 26.8° K and 88.0 psi respectively. The load was a liquid hydrogen bubble chamber as described in the Proceedings of the 1966 International Conference on Instrumentation for High-Energy Physics, published by the U.S. Atomic Energy Commission. The load was controlled to be within 1/150° K of a nominal temperature of 26.8° K. The inlet and outlet metering valves 20 and 21 were air-operated process control valves manufactured by Precision Products and Controls, Incorporated of Tulsa, Oklahoma. The sensors 31, 35, 36 and 37 were standard hydrogen-filled vapor pressure thermometers exemplifying a plurality of such sensors throughout the system. The transmitters 39, 44 and 48 were differential pressure transmitters manufactured by Barton Instrument Corporation of Monterey Park, California. The controller 46 was a proportional, reset, plus rate controller and the controllers 32, 40, 42 and 50 were proportional plus reset controllers all manufactured by Moore Products Co. of Spring House, Pennsylvania. The tubing 10 was of stainless steel having an inside diameter of one-half inch. The heater power source 27 was of the variable transformer type operating on 117 VAC; and the valve 30 was an air-operated process control valve manufactured by Precision Products and Controls Incorporated of Tulsa Oklahoma. The temperature regulator 33 was a two-position, pressure-actuated switch, manufactured by Custom Component Switches Incorporated of Chatsworth, California. The system was operated without a cooling element 26 and control coolant supply 28.

While an embodiment of the invention has been shown and described, further embodiments or combinations of those described herein will be apparent to those skilled in the art without departing from the spirit of the invention.

We claim:

1. A temperature-control system for precisely maintaining a heat load at a predetermined temperature, comprising:
   a heat-emitting mass that is arranged as a heat load within said system;
   a supply of liquid coolant;
   preconditioning means for bringing said supply of liquid coolant to a state of thermodynamic equilibrium at a temperature that is below said predetermined load temperature;
   conduit having an inlet and an outlet for conducting coolant from said supply into heat-transfer relationship with said heat-emitting mass to absorb heat therefrom;
   means for circulating coolant from said supply through said conduit;
   means for sensing changes in temperature-pressure condition of coolant in said conduit; and
   controlling means responsive to said sensing means for adjusting the rate of coolant flow through said conduit to establish throughout said conduit a wet mixture of coolant in a condition of saturation at a temperature slightly below said predetermined load temperature,
   a portion of said controlling means being in heat-transfer relationship with the coolant circulating within said system, and
   said preconditioning means including a preconditioning chamber with said portion being mounted within said chamber to be maintained in thermodynamic equilibrium with the coolant contained in said preconditioning means.

2. The system of claim 1, further including,
   means for maintaining said chamber filled with liquid coolant and vaporous coolant in the ratio of at least one volume of vaporous coolant to one volume of liquid coolant; and
   wherein said chamber is arranged to provide the liquid coolant with a large free-liquid surface area that is at least one-fourth of the total area bounding the volume of liquid coolant.

3. The system of claim 1, wherein said portion mounted within said chamber includes,
   an inlet metering valve connected to said inlet of said conduit for controlling the flow of coolant from said supply into said conduit; and
   an outlet metering valve connected to said outlet of said conduit for controlling the flow of coolant from said conduit to a low-pressure area.

4. The system of claim 3, wherein said inlet and outlet metering valves are adjusted to provide a slight flow of said coolant in a wet-mixture state beyond said outlet metering valve.

5. The system of claim 1, wherein said preconditioning means includes means for adding heat to said supply of coolant upon the temperature of said coolant supply falling below said temperature that is below said predetermined load temperature, and means for removing heat from said coolant upon the temperature of said coolant rising above said temperature that is below said predetermined load temperature.

6. The system of claim 1, wherein said preconditioning means includes means for maintaining said supply of liquid coolant in a continuously boiling state.

7. The system of claim 1, further including means for preheating coolant circulated from said supply through said conduit during initial cooling of said mass, said preheating means being mounted within said chamber to be maintained in thermodynamic equilibrium with the coolant in said chamber during operation of said system.

* * * * *